United States Patent [19]
Yokohata et al.

[11] Patent Number: 6,072,663
[45] Date of Patent: Jun. 6, 2000

[54] MAGNETIC HEAD SLIDER WITH ELONGATED PROJECTIONS FOR REDUCING STICTION AND DUST BUILDUP

[75] Inventors: Toru Yokohata; Takayuki Yamamoto; Yoshiharu Kasamatsu; Takashi Toyoguchi, all of Kawasaki, Japan

[73] Assignee: Fujitsu Limited, Kawasaki, Japan

[21] Appl. No.: 08/949,136

[22] Filed: Oct. 10, 1997

[30] Foreign Application Priority Data

Mar. 17, 1997 [JP] Japan ................................. 9-063439

[51] Int. Cl.⁷ .............................. G11B 5/60; G11B 15/64
[52] U.S. Cl. ................................................. 360/103
[58] Field of Search ..................................... 360/102–103

[56] References Cited

U.S. PATENT DOCUMENTS

| | | | |
|---|---|---|---|
| 5,267,104 | 11/1993 | Albrecht et al. ............... | 360/97.02 |
| 5,748,408 | 5/1998 | Barrois et al. .................. | 360/103 |

FOREIGN PATENT DOCUMENTS

| | | |
|---|---|---|
| 5171117 | 6/1976 | Japan . |
| 63-291280 | 11/1988 | Japan . |
| 1303625 | 12/1989 | Japan . |
| 476875 | 3/1992 | Japan . |
| 4276331 | 10/1992 | Japan . |
| 589624 | 4/1993 | Japan . |

*Primary Examiner*—George J. Letscher
*Attorney, Agent, or Firm*—Greer, Burns & Crain, Ltd.

[57] ABSTRACT

A magnetic head slider having an air inlet end surface and an air outlet end surface, including a pair of rails formed on a disk opposing surface opposed to a magnetic disk, each of the rails having a flat air bearing surface for generating a flying force during rotation of the magnetic disk and a tapering surface formed continuously to the air bearing surface so as to meet the air inlet end surface; and an electromagnetic transducer formed on the air outlet end surface at a position where one of the rails is formed. The magnetic head slider further includes a pair of projections each formed continuously on the tapering surface and the air bearing surface of each rail, each of the projections extending to a peripheral edge of the air bearing surface.

20 Claims, 13 Drawing Sheets

MAGNETIC HEAD SLIDER WITH ELONGATED PROJECTIONS FOR REDUCING STICTION AND DUST BUILDUP

BACKGROUND OF THE INVENTION

1. Field of the Invention

The present invention relates to a structure of a flying type magnetic head slider used in a magnetic disk drive.

2. Description of the Related Art

In recent years, a reduction in size and an increase in capacity of a magnetic disk drive as a kind of external storage device for a computer have been desired. One method of increasing the capacity of the magnetic disk drive is to increase the number of magnetic disks mounted on a spindle, and in association therewith the spacing between the magnetic disks in a recent magnetic disk drive has increasingly been reduced. In a recent magnetic disk drive, a flying type magnetic head adopting a contact start and stop (CSS) system has frequently been used. In such a flying type magnetic head adopting the CSS system, a magnetic head comes into contact with a magnetic disk when the disk drive stops operation, whereas the magnetic head is kept flying at a microscopic height from the disk surface by an air flow generating over the disk surface rotating at a high speed in recording or reproducing information.

In the flying type magnetic head adopting the CSS system, an electromagnetic transducer (magnetic head element) is built in a slider for receiving the air flow generating over the disk surface, and the slider is supported by a suspension. Accordingly, when the magnetic disk remains still, the slider including the electromagnetic transducer is in contact with the disk surface, whereas when the magnetic disk is rotated, a disk opposing surface of the slider opposed to the magnetic disk receives an air flow generated by rotation of the magnetic disk, and the slider flies from the disk surface. The electromagnetic transducer built in the slider is moved over the disk surface as being supported by the suspension to perform recording or reproduction of information at a given track.

In a magnetic disk drive employing a conventional flying type magnetic head slider, a pair of rails are provided on opposite side portions of a disk opposing surface of the magnetic head slider opposed to the disk surface. Each rail has a flat air bearing surface. Further, a tapering surface is formed on each rail so as to meet an air inlet end surface of the slider. The air bearing surface of each rail receives an air flow generated by high-speed rotation of a magnetic disk to fly the slider and stably maintains a microscopic distance between the disk surface and the electromagnetic transducer.

According to the CSS system, a high flying stability and a microscopic flying height (submicrons) can be ensured. However, when the disk remains still, rail surfaces (air bearing surfaces) of the slider are in contact with the disk. Accordingly, when the magnetic disk drive starts or stops operation, the air bearing surfaces relatively slide on the disk. To cope with such sliding, a protective film made of a hard material such as carbon and a lubricating layer for reducing friction and wear of the protective film to improve durability of the magnetic disk are formed on a recording layer of the disk. Owing to the presence of the lubricating layer, friction and wear of the protective film can be reduced. However, when the disk drive stops operation, there is a possibility that stiction between the disk and the slider may occur causing a problem that the disk drive cannot be restarted.

In association with a recent increase in the amount of information, the developments in high density, large capacity, and small size of a magnetic disk drive have become remarkable, and the occurrence of stiction has been greatly highlighted as a cause of faulty operation due to a reduction in torque of a spindle motor in association with the size reduction and due to the smoothing of the disk surface for the high density. To reduce the stiction between the slider and the disk, it has been proposed to perform crowning of the flying surfaces (rail surfaces) of the slider over the entire length in the longitudinal direction to thereby reduce a contact area between the slider and the disk.

While the slider thus crowned is effective for prevention of the stiction, there is a problem that variations in working accuracy are large and an increase in cost of the slider results, so that such a slider is unsuitable for mass production. Further, crowning is performed in the longitudinal direction of each flying surface of the slider, so that each rail surface of the slider becomes nearer to the disk than the electromagnetic transducer (head element) formed on an air inlet end surface of the slider, causing a problem that a spacing loss is produced.

Further, the use of a contact type head intended to attain a zero flying height has recently started to be considered in response to the development in high density, and it is therefore more important to prevent the stiction between the disk and the slider causing faulty operation and fracture of the electromagnetic transducer or the recording layer of the disk. To prevent this stiction problem, it has been proposed to provide a plurality of projections on the flying surfaces (air bearing surfaces) of the slider, thereby reducing a contact area between the slider and the disk surface (Japanese Patent Laid-open No. 8-69674).

A structure of a magnetic head slider 2 described in the above-mentioned publication will now be described in brief with reference to FIG. 1A. A pair of rails 4 and 6 are formed at opposite side portions of the magnetic head slider 2. The rails 4 and 6 respectively have flat air bearing surfaces 4a and 6a for generating a flying force during rotation of a magnetic disk. Further, tapering surfaces 4b and 6b are formed at air inlet end portions of the rails 4 and 6, respectively. A plurality of projections 10 are formed on the air bearing surfaces 4a and 6a of the rails 4 and 6. An electromagnetic transducer 8 is integrally formed on an air outlet end surface of the slider 2 at a position where the rail 4 is formed.

The magnetic head slider described in the above-mentioned publication is characterized in that the projections 10 are provided in order to avoid the contact between the air bearing surfaces 4a and 6a and the disk surface. With this structure, if a slight amount of dust is present on the disk surface in an actual disk drive, the dust tends to gather on the air bearing surfaces 4a and 6a at positions just downstream of the projections 10.

More specifically, in the magnetic head slider described in the above-mentioned publication, the rear ends of the projections 10 are present on the air bearing surfaces 4a and 6a. Accordingly, as shown in FIG. 1B, air flows near each projection 10 so as to pass over each projection 10 as shown by arrows A. At this time, a vacuum is generated near a position P at the rear end of each projection 10, and the air flow stays near this position P. As a result, the dust suspended in the air flow gathers near the position P, and in some case the dust is deposited at this position. Thus, in contrast with a slider without any projections, the conventional slider shown has a problem that the slight amount of dust has an adverse effect on flying characteristics of the slider.

The magnetic head slider described in the above-mentioned publication also has the following problem. As shown in FIG. 2A, the magnetic head slider 2 in an inoperative condition of the magnetic disk drive remains still in such a manner that the projections 10 are in contact with the surface of a magnetic disk 5. Reference numeral 7 denotes a fulcrum at which the slider 2 is supported by a suspension (not shown). When a starting rotational force having a direction of an arrow R is applied to the slider 2, the position of the slider 2 changes to a tilt position as shown in FIG. 2B because of the balance of moments about the fulcrum 7 of the slider 2. That is, the tapering surfaces 4b and 6b formed on the upstream side (air inlet side) of the air bearing surfaces 4a and 6a come into contact with the disk 5, causing stiction between the slider 2 and the disk 5.

The stiction force in this case is sufficiently smaller than that in the case that the slider has no projections and the entirety of the air bearing surfaces comes into contact with the disk. Accordingly, stiction trouble hardly occurs in the disk drive in general. However, a large force acts between the contact surfaces of the magnetic head slider and the magnetic disk, causing wear of the disk surface. As a result, wear powder generated at this time will subsequently behave as dust.

SUMMARY OF THE INVENTION

It is therefore an object of the present invention to provide a magnetic head slider which can avoid stiction trouble occurring at the start of rotation of a magnetic disk in a magnetic disk drive, and can also reduce adverse effects of a minute amount of dust possibly present in the magnetic disk drive upon the flying characteristics of the magnetic head slider.

In accordance with an aspect of the present invention, there is provided a magnetic head slider having an air inlet end surface and an air outlet end surface, comprising a pair of rails formed on a disk opposing surface opposed to a magnetic disk, each of said rails having a flat air bearing surface for generating a flying force during rotation of said magnetic disk and a tapering surface formed continuously to said air bearing surface so as to meet said air inlet end surface; an electromagnetic transducer formed on said air outlet end surface at a position where one of said rails is formed; and a pair of projections each formed continuously on said tapering surface and said air bearing surface of each rail, each of said projections extending to a peripheral edge of said air bearing surface.

Preferably, each projection extends to the air outlet end surface of each rail. Alternatively, each projection may extend to a side surface of each rail. Preferably, each projection is formed from an amorphous carbon film or a thin oxide film such as an $SiO_2$ film or $Al_2O_3$ film.

In accordance with another aspect of the present invention, there is provided a magnetic head slider having an air inlet end surface and an air outlet end surface, comprising a pair of rails formed on a disk opposing surface opposed to a magnetic disk, each of said rails having a flat air bearing surface for generating a flying force during rotation of said magnetic disk and a tapering surface formed continuously to said air bearing surface so as to meet said air inlet end surface; an electromagnetic transducer formed on said air outlet end surface at a position where one of said rails is formed; and a pair of projections each formed continuously on said tapering surface and said air bearing surface of each rail, each of said projections extending to said air outlet end surface; wherein each projection is formed by partially removing said tapering surface and said air bearing surface of each rail, and a forming position of said electromagnetic transducer is set on the basis of a surface of at least one of said projections.

In accordance with a further aspect of the present invention, there is provided a vacuum magnetic head slider having an air inlet end surface and an air outlet end surface, comprising a pair of rails formed on a disk opposing surface opposed to a magnetic disk, each of said rails having a flat air bearing surface for generating a flying force during rotation of said magnetic disk and a tapering surface formed continuously to said air bearing surface so as to meet said air inlet end surface, a groove for generating a vacuum by expanding air once compressed being defined between said rails; an electromagnetic transducer formed on said air outlet end surface at a position where one of said rails is formed; and a pair of projections each formed continuously on said tapering surface and said air bearing surface of each rail, each of said projections extending to a peripheral edge of said air bearing surface.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 3:
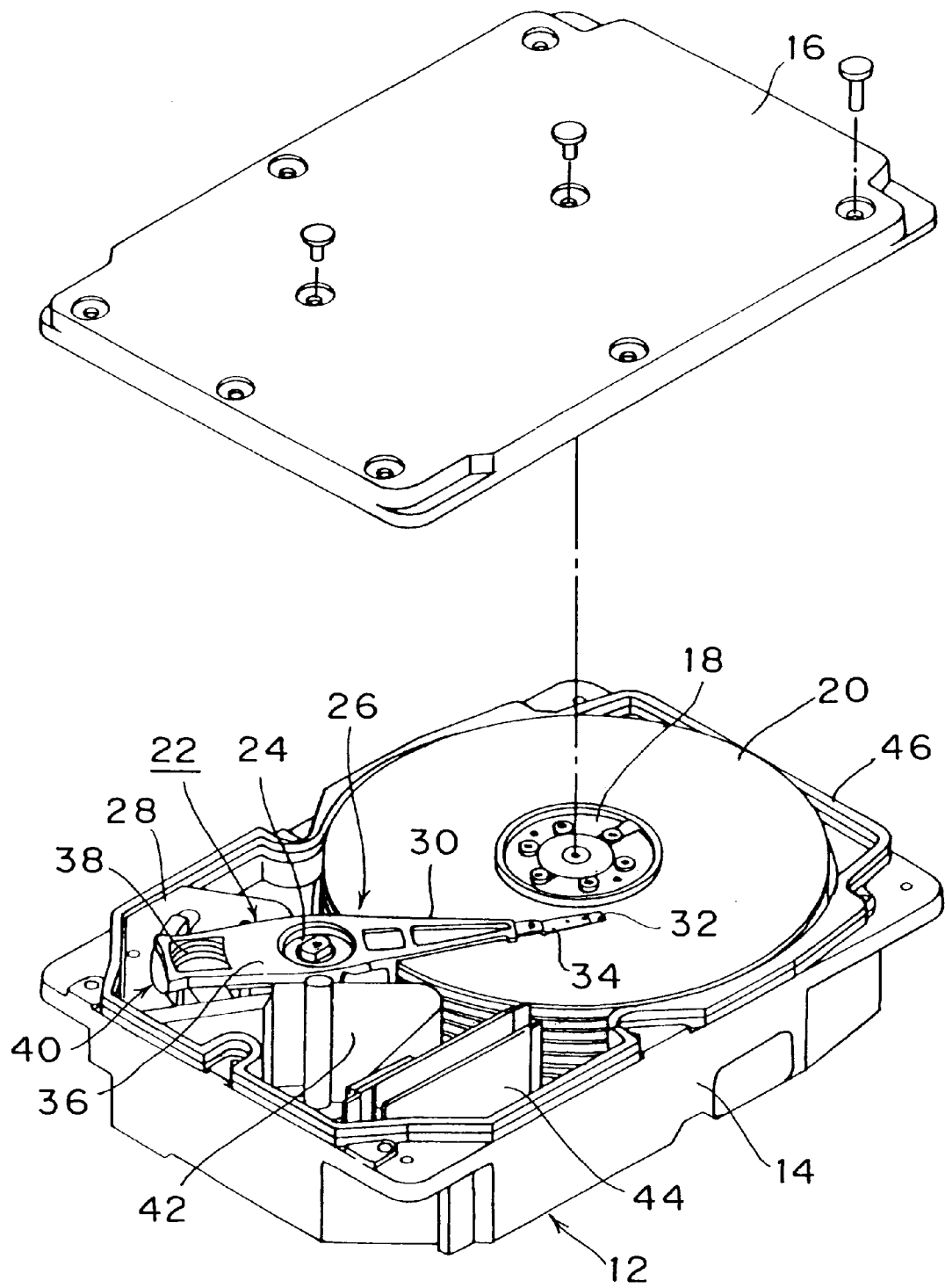
FIG. 3 is a perspective view of a magnetic disk drive.

Referring to FIG. 3, there is shown a perspective view of a magnetic disk drive in which a magnetic head slider according to the present invention is mounted. Reference numeral 12 denotes a housing (disk enclosure) consisting of a base 14 and a cover 16. A spindle hub (not shown) rotatably driven by an inner hub motor is provided on the base 14. A plurality of magnetic disks 20 and spacers (not shown) are mounted on the spindle hub in such a manner as to be alternately stacked. That is, the plural magnetic disks 20 are fixedly mounted on the spindle hub by securing a disk clamp 18 to the spindle hub by screws, and are equally spaced a given distance by the spacers.

Reference numeral 22 denotes a rotary actuator consisting of an actuator arm assembly 26 and a magnetic circuit 28. The actuator arm assembly 26 is mounted so as to be rotatable about a shaft 24 fixed to the base 14. The actuator arm assembly 26 includes a plurality of actuator arms 30 extending from the center of rotation in one direction and a coil supporting member 36 extending from the center of rotation in a direction opposite to the direction of extension of the actuator arms 30.

A suspension 34 is fixed at its base end portion to a front end portion of each actuator arm 30. A magnetic head slider 32 is supported to a front end portion of the suspension 34. A coil 38 is supported by the coil supporting member 36. The magnetic circuit 28 and the coil 38 inserted in a gap of the magnetic circuit 28 constitute a voice coil motor (VCM) 40.

Reference numeral 42 denotes a flexible printed circuit board (FPC) for taking a signal from an electromagnetic transducer mounted on the head slider 32. The flexible printed circuit board 42 is fixed at its one end by a fixing member 44, and is electrically connected to a connector (not shown). An annular packing assembly 46 is mounted on the base 14. The housing 12 is sealed by securing the cover 16 through the packing assembly 46 to the base 14 by screws.

Figure 4A:
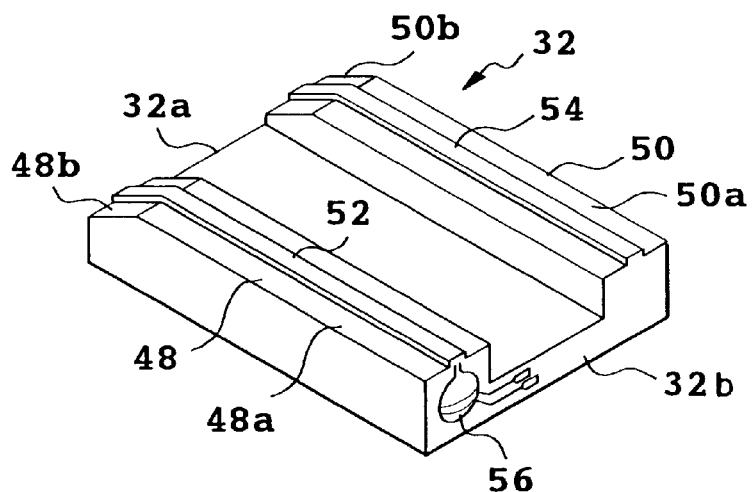
FIG. 4A is a perspective view of a magnetic head slider according to a first preferred embodiment of the present invention.
Figure 4B:
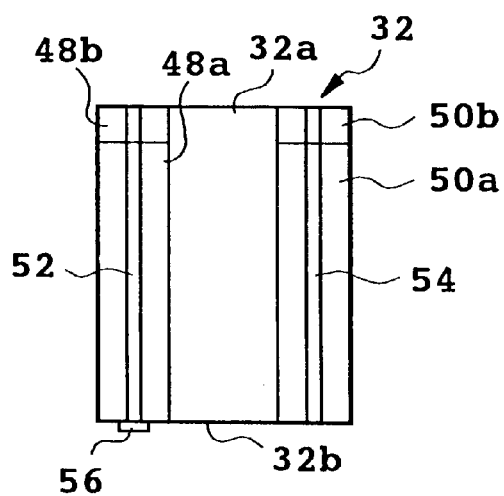
FIG. 4B is a plan view of FIG. 4A.

FIG. 4A shows a perspective view of a magnetic head slider 32 according to a first preferred embodiment of the present invention, and FIG. 4B shows a plan view of FIG. 4B. The magnetic head slider 32 has an air inlet end surface 32a and an air outlet end surface 32b. A pair of rails 48 and 50 are formed at opposite side portions of the slider 32. The rails 48 and 50 have flat rail surfaces (air bearing surfaces) 48a and 50a, respectively. Tapering surfaces 48b and 50b are formed at air inlet end portions of the rails 48 and 50, respectively. An electromagnetic transducer (head element) 56 is formed on the air outlet end surface 32b of the rail 48.

Projections 52 and 54 are formed on the rails 48 and 50 so as to be elongated continuously from the air inlet end surface 32a to the air outlet end surface 32b. The projections 52 and 54 are formed from a thin film of hard material such as diamond-like carbon (DLC). The projections 52 and 54 are formed on the rails 48 and 50 through an SiC layer as an adhesion layer having a thickness of 5 nm or less by a thin-film process. The height of each of the projections 52 and 54 is set to a suitable value of about 30 nm having no adverse effect on flying of the slider 32.

Since the elongated projections 52 and 54 are formed on the rails 48 and 50, the rear ends of the projections 52 and 54 are absent on the air bearing surfaces 48a and 50a. Accordingly, a position where a vacuum is generated is limited to the outside of the air bearing surfaces 48a and 50a of the rails 48 and 50. As a result, it is possible to prevent a vacuum from being generated at a position downstream of each projection on the corresponding air bearing surface to cause the deposition of dust at this position as in the prior art previously described with reference to FIG. 1B.

Figure 2A:
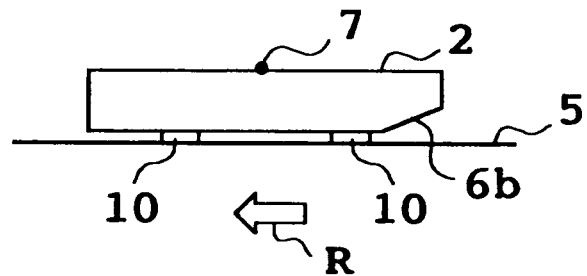
FIGS. 2A and 2B are side views illustrating a problem in the prior art.
Figure 2B:
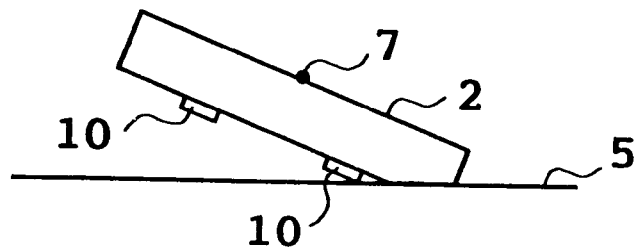

Further, according to the slider 32 of this preferred embodiment, the projections 52 and 54 are formed also on the tapering surfaces 48b and 50b continuous from the front ends (air inlet side) of the air bearing surfaces 48a and 50a. Accordingly, it is possible to prevent the tapering surfaces from coming into contact with the magnetic disk and causing stiction as in the prior art previously described with reference to FIG. 2B. As a result, the generation of dust is remarkably reduced.

In this preferred embodiment, the projections 52 and 54 extending from the air inlet end surface 32a to the air outlet end surface 32b are provided on the air bearing surfaces 48a and 50a of the rails 48 and 50, respectively. Accordingly, when the disk stops rotating, only these two projections 52 and 54 come into contact with the disk.

The smaller the contact area between two surfaces coming into contact with each other through a lubricant, the smaller the stiction force acting between the two surfaces. Accordingly, owing to the provision of the projections 52 and 54 on the rails 48 and 50, the contact area between the disk and the slider is smaller than that in the prior art wherein the entire surface of each rail comes to contact with the disk, so that the stiction force is reduced to thereby suppress the stiction.

Figure 5A:
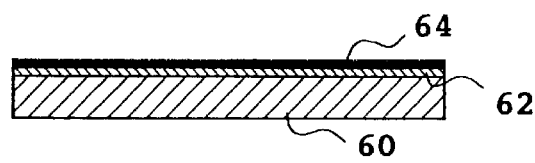
FIGS. 5A to 5H are sectional views showing a fabrication method for the magnetic head slider.

A fabrication method for the slider 32 of the first preferred embodiment will now be described with reference to FIGS. 5A to 5H and FIGS. 6A to 6D. A wafer 58 shown in FIG. 6A is formed with a plurality of electromagnetic transducers 56. The wafer 58 is cut to obtain a bar-shaped $Al_2O_3$-TiC substrate 60. As shown in FIG. 5A, an adhesion layer 62 of SiC having a thickness of about 2 nm is formed on the substrate 60 by sputtering. Next, a diamond-like carbon layer (DLC layer) 64 having a thickness of about 30 nm is formed on the adhesion layer 62 by plasma CVD. The SiC layer 62 serves both as an insulation protection layer for the electromagnetic transducer 56 and as an adhesion layer for the DLC layer 64.

Figure 5B:
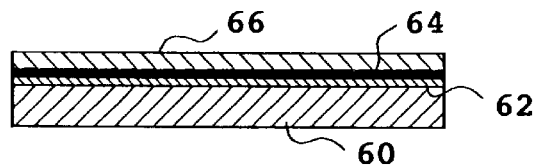
Figure 5C:
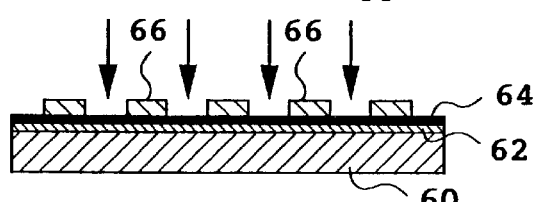
Figure 5D:
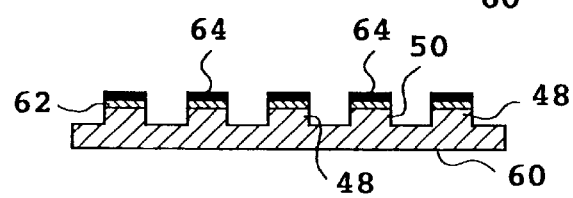
Figure 5E:
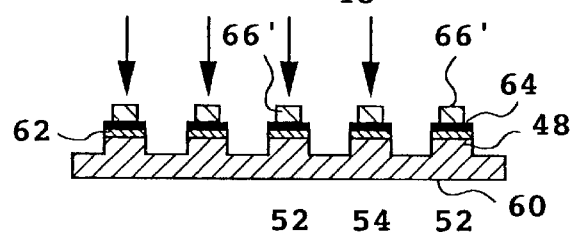
Figure 5F:
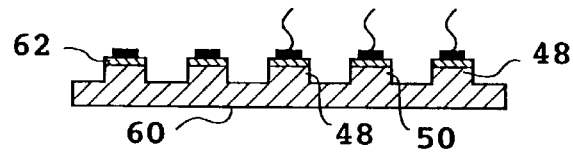
Figure 5G:
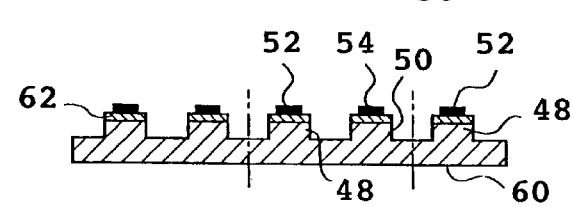
Figure 5H:
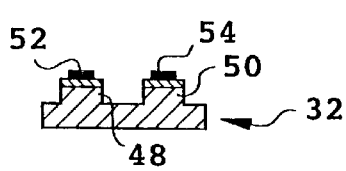
Figure 6A:
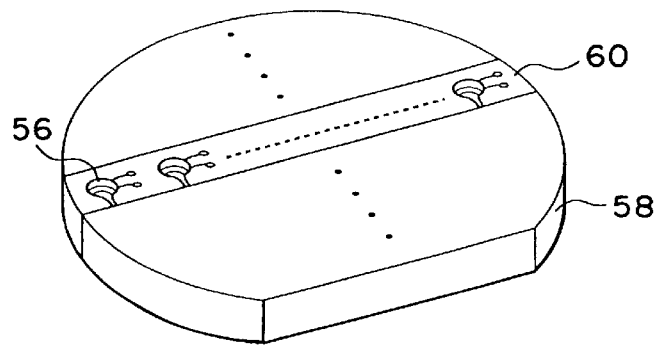
FIGS. 6A to 6D are perspective views showing the fabrication method shown in FIGS. 5A to 5H.
Figure 6B:
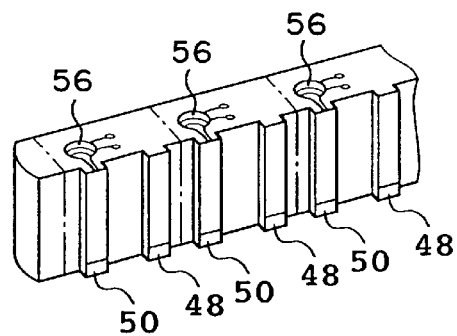
Figure 6C:
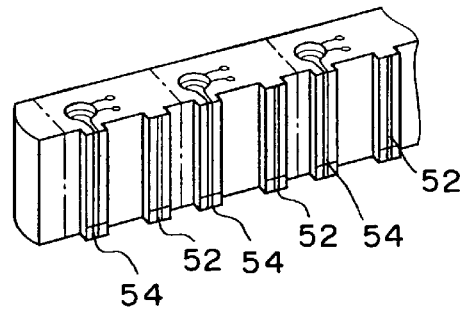
Figure 6D:
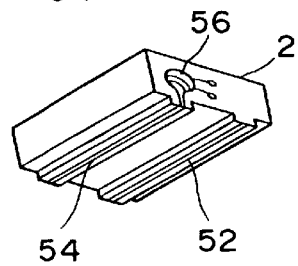

As shown in FIG. 5B, a photoresist 66 is applied to the DLC layer 64, and as shown in FIG. 5C, the photoresist 66 is next exposed to light and developed by using a mask with a given pattern. As shown in FIG. 5D, the substrate 60 is etched by ion milling to form a plurality of rails 48 and 50. This condition is shown in perspective in FIG. 6B. Next, a photoresist 661 is applied again, and it is next exposed to light to form a projection pattern as shown in FIG. 5E. Next, a portion of the DLC layer 64 except for the projection pattern is etched off by ion milling as shown in FIG. 5F.

As a result, a plurality of projections 52 and 54 of DLC are formed on the rails 48 and 50. This condition is shown in perspective in FIG. 6C. Next, the substrate 60 is cut along phantom lines shown in FIG. 5G to thereby obtain individual sliders 32, one of which is shown in cross section in FIG. 5H, and is also shown in perspective in FIG. 6D.

While the DLC film formed by plasma CVD is used as the material for the projections 52 and 54 in the above preferred embodiment, an amorphous carbon film such as a carbon film, carbon hydroxide film, and silicon-added carbon film formed by sputtering may be used. The amorphous carbon film has a high hardness and a wear resistance sufficient to endure contact and slide between the slider and the disk upon stopping of rotation of the disk. Further, since the amorphous carbon film is used as a protective film for the disk, this material may be suitably used as the material for the projections 52 and 54.

Further, a thin oxide film such as an $SiO_2$ film and $Al_2O_3$ film may also be used as the material for the projections 52 and 54 to be formed on the rails 48 and 50. Since $SiO_2$ and $Al_2O_3$ are dense and hard, these materials are suitable as the material for the projections 52 and 54. Such a thin oxide film that can endure contact and can slide between the slider 32 and the disk may be used as the material for the projections 52 and 54 to be formed on the rails 48 and 50.

Figure 7A:
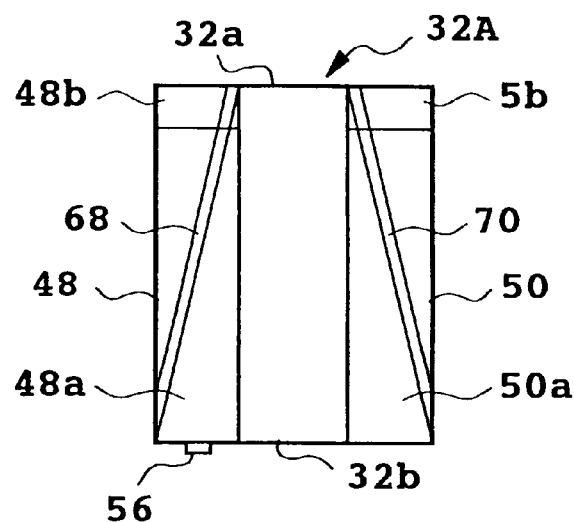
FIG. 7A is a plan view of a magnetic head slider according to a second preferred embodiment of the present invention.

FIG. 7A shows a plan view of a magnetic head slider 32A according to a second preferred embodiment of the present invention. In the following description of this preferred embodiment and subsequent preferred embodiments, substantially the same parts as those in the first preferred embodiment are denoted by the same reference numerals, and the description thereof will be omitted to avoid repetition. In this preferred embodiment, projections 68 and 70 are formed on the rails 48 and 50, respectively, so as to extend from the air inlet end surface 32a to the outer side edges of the rails 48 and 50. That is, the projections 68 and 70 extend obliquely in such a manner as to be ended at the outer side edges of the rails 48 and 50, respectively. Also in this preferred embodiment having the obliquely extending projections 68 and 70, no vacuum is generated on the air bearing surfaces 48a and 50a, so that there is no possibility of deposition of dust on the air bearing surfaces 48a and 50a.

Figure 7B:
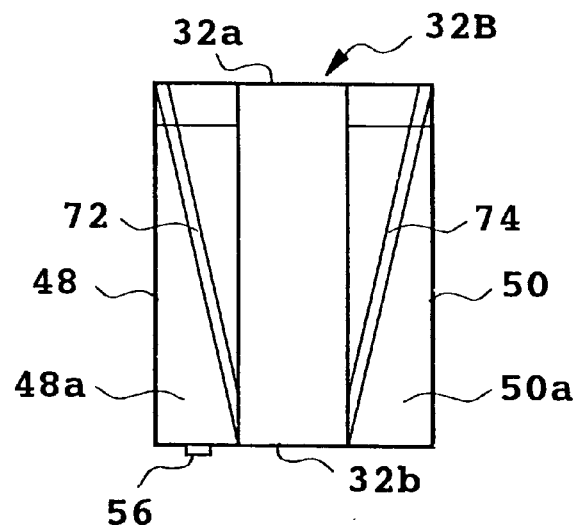
FIG. 7B is a plan view showing a modification of the second preferred embodiment.

FIG. 7B is a plan view of a magnetic head slider 32B, showing a modification of the second preferred embodiment. In this modification, projections 72 and 74 extend obliquely so as to be ended at the inner side edges of the rails 48 and 50, respectively. Also in this modification, an effect similar to that of the second preferred embodiment can be obtained.

Figure 8A:
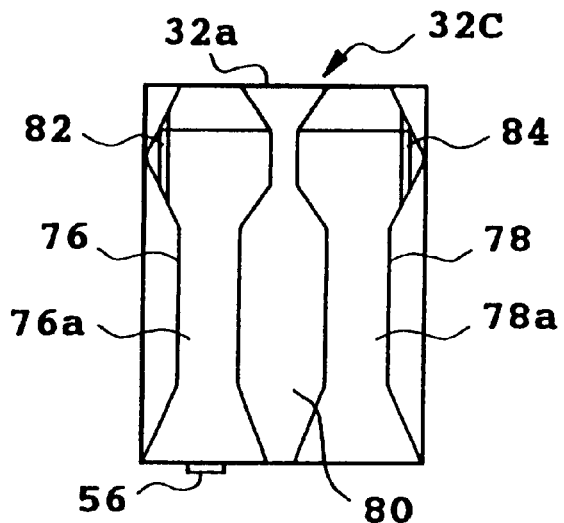
FIG. 8A is a plan view of a magnetic head slider according to a third preferred embodiment of the present invention.

Referring to FIG. 8A, there is shown a plan view of a magnetic head slider 32C according to a third preferred embodiment of the present invention. The slider 32C in this preferred embodiment is a vacuum slider having a vacuum generating groove 80 defined between a pair of rails 76 and 78. Each of the rails 76 and 78 has a hourglass-like shape as shown. Owing to such a specific shape of each rail, projections 82 and 84 are formed only at the front end portions (on the air inlet side) of air bearing surfaces 76a and 78a. That is, the rear end portions of the projections 82 and 84 are not required to reach the rear ends of the air bearing surfaces 76a and 78a.

Figure 8B:
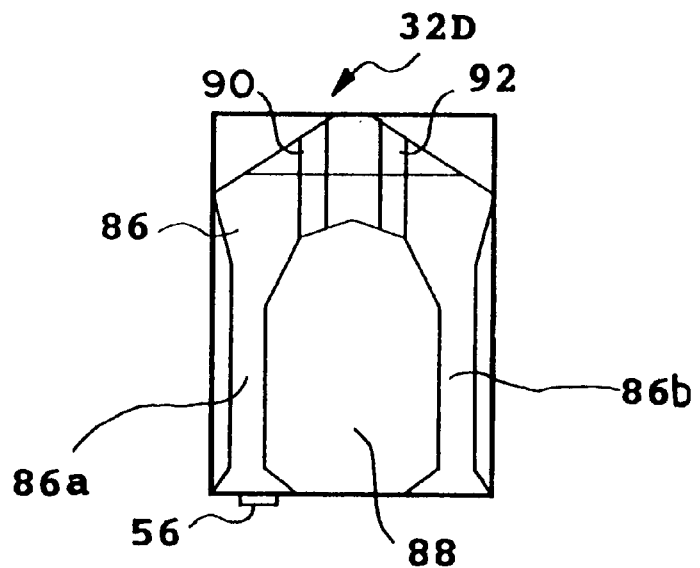
FIG. 8B is a plan view showing a modification of the third preferred embodiment.

FIG. 8B is a plan view of a vacuum slider 32D, showing a modification of the third preferred embodiment. The slider 32D in this modification has a U-shaped rail 86 having a pair of rail portions 86a and 86b, between which a vacuum generating groove 88 is defined. Also in this modification having the U-shaped rail 86, projections 90 and 92 are formed only at the front end portion of the U-shaped rail 86. That is, the projections 90 and 92 are not required to be ended at the rear end of the rail 86.

Figure 9A:
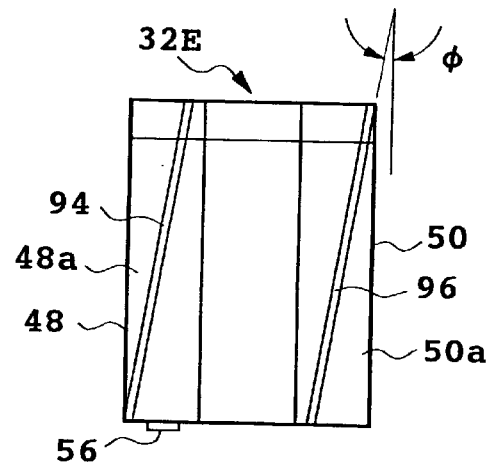
FIG. 9A is a plan view of a magnetic head slider according to a fourth preferred embodiment of the present invention.

Referring to FIG. 9A, there is shown a plan view of a magnetic head slider 32E according to a fourth preferred embodiment of the present invention. The slider 32E in this preferred embodiment has obliquely extending projections 94 and 96 formed on the rails 48 and 50. The projections 94 and 96 extend in parallel to each other, and an angle of inclination, φ, of the projections 94 and 96 is set substantially equal to a yaw angle of the slider 32E at a position (CSS zone) where the slider 32E comes into contact with and slides on the magnetic disk.

Figure 9B:
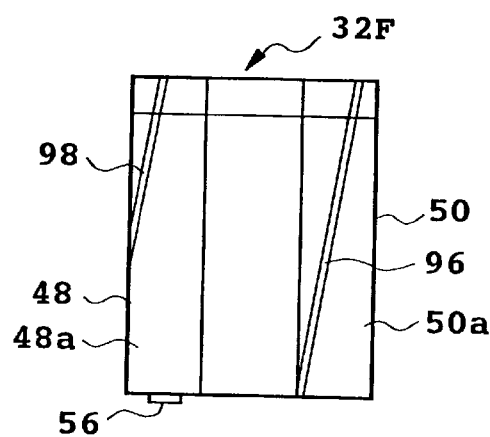
FIGS. 9B and 9C are plan views showing modifications of the fourth preferred embodiment.
Figure 9C:
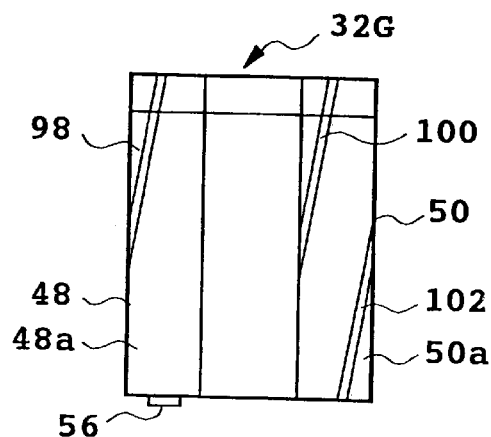

By this setting of the inclination angle φ, the projections 94 and 96 slide on the surface of the magnetic disk as in ice skating when the contact and slide of the slider 32E and the magnetic disk occur. Accordingly, the CSS operation can be smoothly performed to thereby reduce the wear of the disk surface and remarkably reduce the generation of dust. FIGS. 9B and 9C are plan views of magnetic head sliders 32F and 32G, respectively, showing modifications of the fourth preferred embodiment.

In the fourth preferred embodiment, the height of the projections 94 and 96 from the air bearing surfaces 48a and 50a must be set to some value or more. However, it is not preferable if the distance between the disk surface and the electromagnetic transducer during the operation of the magnetic disk drive becomes large. To cope with this disadvantage, the modifications shown in FIGS. 9B and 9C have been made. That is, the air bearing surfaces 48a and 50a of the rails 48 and 50 are formed asymmetrically with respect to each other to provide tilt of the slider both in its longitudinal direction and in its lateral direction in the flying condition during the operation of the disk drive, thereby making the position of the electromagnetic transducer closest to the disk surface.

In the modification shown in FIG. 9B, a projection 98 is ended at the outer side edge of the rail 48. In the modification shown in FIG. 9C, two projections 100 and 102 are formed on the air bearing surface 50a of the rail 50. By making the shapes of the projections 96 and 98 different from each other as shown in FIG. 9B or by making the number of the projections 98, 100, and 102 on the air bearing surfaces 48a and 50a different from each other as shown in FIG. 9C, the position of the electromagnetic transducer during the operation of the disk drive can be reliably made closest to the disk surface.

Figure 10A:
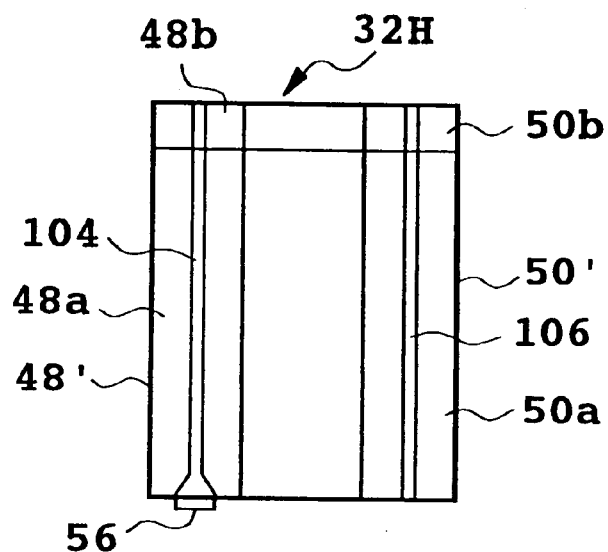
FIG. 10A is a plan view of a magnetic head slider according to a fifth preferred embodiment of the present invention.
Figure 10B:
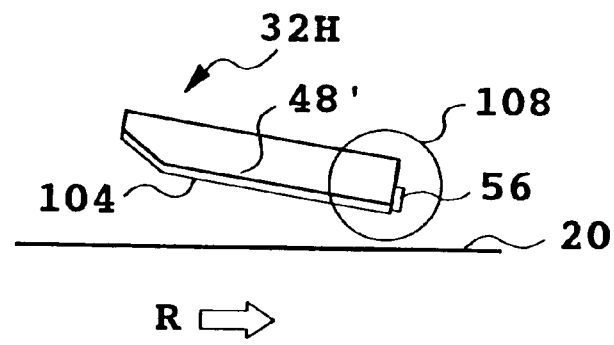
FIG. 10B is a side view of the magnetic head slider shown in FIG. 10A in its flying condition.
Figure 10C:
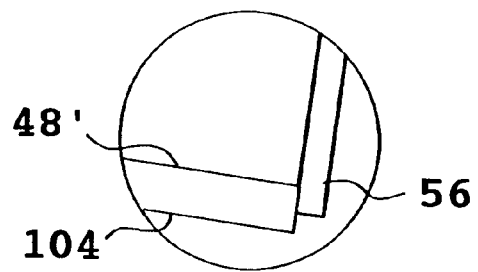
FIG. 10C is an enlarged view of a part enclosed by a circle 108 shown in FIG. 10B.

Referring to FIG. 10A, there is shown a plan view of a magnetic head slider 32H according to a fifth preferred embodiment of the present invention. FIG. 10B is a side view of the slider 32H in its flying condition, and FIG. 10C is an enlarged view of a part enclosed by a circle 108 shown in FIG. 10B. As mentioned above, the height of the projections from the air bearing surfaces must be set to some value or more, but it is not preferable if the distance between the disk surface and the electromagnetic transducer during the operation of the disk drive becomes large.

In each of the preferred embodiments mentioned above, each projection is formed by forming the pair of rails 48 and 50 from the substrate and thereafter depositing the projection forming material such as diamond-like carbon on the rails 48 and 50. Accordingly, each projection projects by a given height from the air bearing surface. If the height of each projection is increased, the distance between the disk surface and the projection becomes smaller than the distance between the disk surface and the electromagnetic transducer during the operation of the disk drive. As a result, there is a possibility of collision between each projection and the disk surface, causing impairment of the stability of the slider during the operation of the disk drive.

The fifth preferred embodiment shown in FIGS. 10A to 10C has solved this problem. In the magnetic head slider 32H of the fifth preferred embodiment, the formation of the rails 48 and 50 and the precise polishing of the rail surfaces are carried out after the formation of the electromagnetic transducer 56. Thereafter, each rail surface is dug to a given depth by ion milling, for example, thereby forming air bearing surfaces 48' and 50' and projections 104 and 106.

As best shown in FIG. 10C, the electromagnetic transducer 56 and the projection 104 project from the air bearing surface 48'. After forming the air bearing surfaces 48' and 50' and the projections 104 and 106, a protective film of amorphous carbon or oxide is formed on the surface of each projection or on the entire disk opposing surface of the slider 32H. In this preferred embodiment characterized in the fabrication method for each projection, there is no possibility that the distance between the disk surface and each of the projections 104 and 106 may become smaller than the distance between the disk surface and the electromagnetic transducer 56 during the operation of the disk drive. The shape of the projections 104 and 106 is merely illustrative, and may be modified to any of the shapes of the projections in the first to fourth preferred embodiments.

Figure 11A:
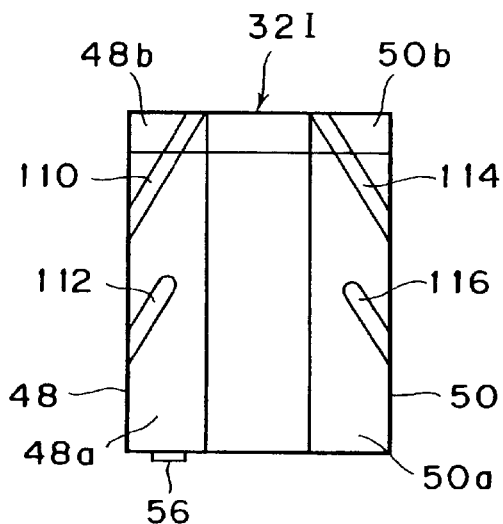
FIG. 11A is a plan view of a magnetic head slider according to a sixth preferred embodiment of the present invention.

Referring to FIG. 11A, there is shown a plan view of a magnetic head slider 32I according to a sixth preferred embodiment of the present invention. In this preferred embodiment, projections 110 and 114 formed on the tapering surfaces 48b and 50b and the front end portions (on the air inlet side) of the air bearing surfaces 48a and 50a extend obliquely from the front edges of the tapering surfaces 48b and 50b to the outer side edges of the air bearing surfaces 48a and 50a, respectively. Another obliquely extending projection 112 is formed downstream of the projection 110 in substantially parallel relationship thereto, and another obliquely extending projection 116 is formed downstream of the projection 114 in substantially parallel relationship thereto. Owing to such an arrangement of the projections 110 and 114 formed on the tapering surfaces 48b and 50b and the front end portions of the air bearing surfaces 48a and 50a, dust generated or present on the disk surface can be positively ejected from the air bearing surfaces 48a and 50a.

Figure 11B:
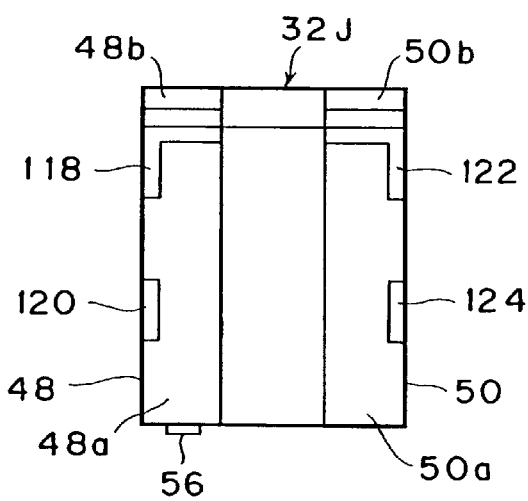
FIGS. 11B and 11C are plan views showing modifications of the sixth preferred embodiment.
Figure 11C:
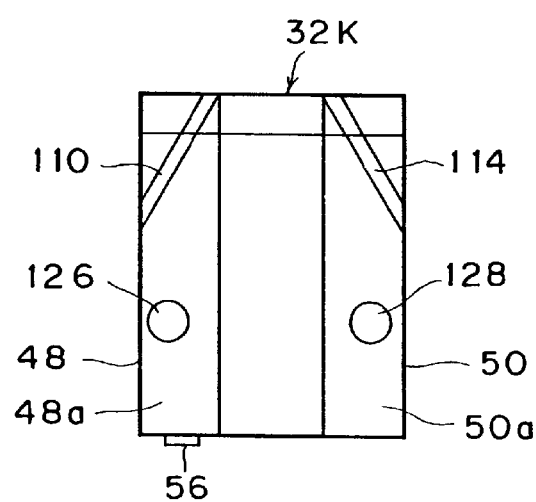

FIGS. 11B and 11C are plan views of magnetic head sliders 32J and 32K, respectively, showing modifications of the sixth preferred embodiment. In the modification shown in FIG. 11B, projections 118 and 122 formed on the tapering surfaces 48b and 50b and the front end portions of the air bearing surfaces 48a and 50a are arranged in a gantry-like configuration with each having an L-shape, thereby positively ejecting the dust from the air bearing surfaces 48a and 50a. Further, another longitudinally extending projection 120 is formed downstream of the projection 118 on the air bearing surface 48a, and another longitudinally extending projection 124 is formed downstream of the projection 122 on the air bearing surface 50a.

In the modification shown in FIG. 11C, projections 110 and 114 formed on the tapering surfaces 48b and 50b and the front end portions of the air bearing surfaces 48a and 50a are similar to those of the sixth preferred embodiment shown in FIG. 11A. The difference between FIG. 11A and FIG. 11C is that the obliquely extending projections 112 and 116 shown in FIG. 11A are replaced by circular projections 126 and 128, respectively. This modification is based on the knowledge that the shape of the downstream projections 126 and 128 may be freely selected when the dust removing effect by the upstream projections 110 and 114 is sufficient.

Figure 1A:
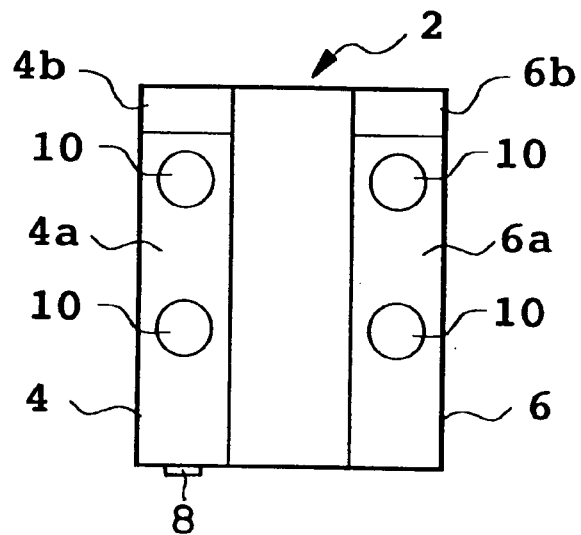
FIG. 1A is a plan view of a magnetic head slider in the prior art.
Figure 1B:
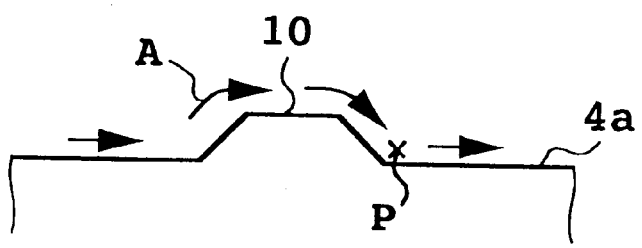
FIG. 1B is a side view of an essential part of the slider shown in FIG. 1A, illustrating a vacuum generating position.

In the conventional slider 2 with the plural projections 10 as shown in FIG. 1A, the contact between the disk surface and the magnetic head slider 2 is absolutely limited to the surfaces of the projections 10, so that crowning (cylindrical surface working) is not usually carried out on the air bearing surfaces 4a and 6a of the slider 2. To the contrary, in the magnetic head slider 32 having the projections 52 and 54 as shown in FIGS. 4A and 4B, crowning can be carried out on the air bearing surfaces 48a and 50a of the slider 32, and the following desirable effects can be obtained.

(1) The contact area between the disk surface and the slider is effectively made smaller than that of the projections 52 and 54, so that the stiction reducing effect by the projections can be exhibited more effectively.

(2) By such an increase of the stiction reducing effect, the CSS operation can be performed more smoothly, thereby further reducing the wear of the disk surface and the surfaces of the projections 52 and 54.

(3) By such a wear reducing effect, the amount of worn powder generated at starting the operation of the disk drive can be greatly reduced, thereby reducing an adverse effect due to the adhesion of dust to the air bearing surfaces of the slider.

Figure 12A:
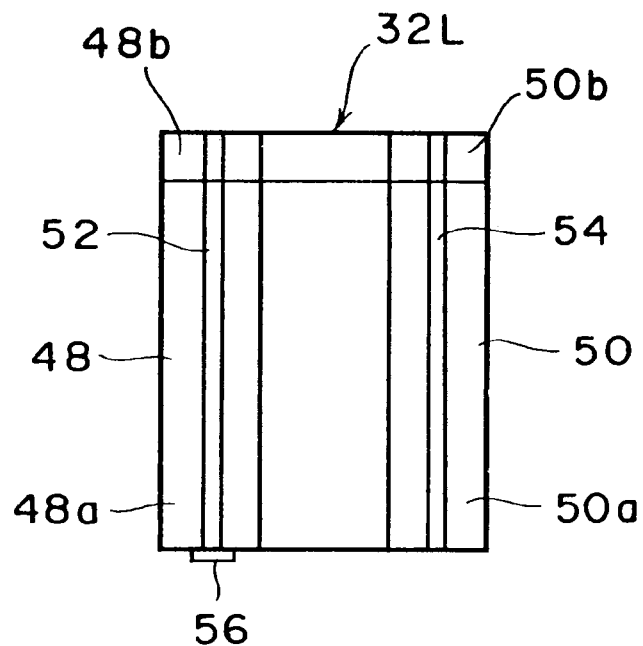
FIG. 12A is a plan view of a magnetic head slider according to a seventh preferred embodiment of the present invention.
Figure 12B:
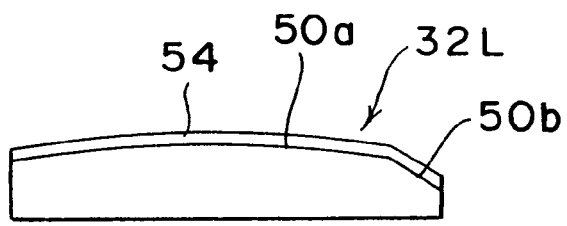
FIG. 12B is a side view of FIG. 12A.

FIGS. 12A and 12B show a magnetic head slider 32L according to a seventh preferred embodiment of the present invention. The slider 32L is obtained by crowning the air bearing surfaces 48a and 50a of the magnetic head slider 32 of the first preferred embodiment. The projections 52 and 54 are also crowned as similar to the air bearing surfaces 48a and 50a.

Figure 13A:
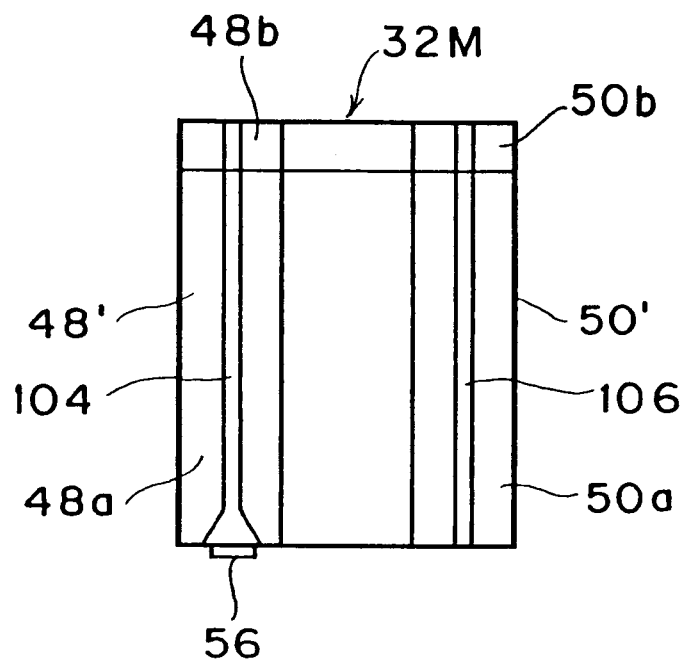
FIG. 13A is a plan view showing a modification of the seventh preferred embodiment.
Figure 13B:
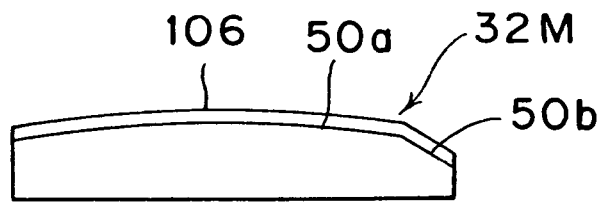
FIG. 13B is a side view of FIG. 13A.

FIG. 13A is a plan view of a magnetic head slider 32M, showing a modification of the seventh preferred embodiment, and FIG. 13B is a side view of FIG. 13A. In this modification, the projections 104 and 106 are formed by digging the rail surfaces except the projections 104 and 106 to a given depth by ion milling as similar to the fifth preferred embodiment shown in FIGS. 10A to 10C. At this time, the air bearing surfaces 48a and 50a and the projections 104 and 106 are crowned by ion milling as shown in FIG. 13B. In this modification, the positional relation between the electromagnetic transducer 56, the projections 104 and 106, and the air bearing surfaces 48a and 50a is similar to that shown in FIG. 10C.

According to the present invention, the occurrence of stiction between the magnetic head slider and the magnetic disk can be reduced to thereby effect a smooth CSS operation of the magnetic head slider and accordingly reduce the wear of the disk surface. Further, gathering of dust on the air bearing surfaces can be suppressed to thereby reduce an adverse effect of a minute amount of dust possibly present in the magnetic disk drive upon the flying characteristics of the magnetic head slider. As a result, the reliability of the magnetic disk drive can be improved.

What is claimed is:

1. A magnetic head slider having an air inlet end surface and an air outlet end surface, comprising:

a pair of rails formed on a disk opposing surface opposed to a magnetic disk, each of said rails having a flat air bearing surface for generating a flying force during rotation of said magnetic disk and a tapering surface formed between said air bearing surface and said air inlet end surface;

an electromagnetic transducer formed on said air outlet end surface at a termination point of one of said rails; and at least one projection formed on each rail of said pair of rails, said at least one projection projecting from and extend along said tapering surface and said air bearing surface, and terminating at a peripheral edge of said air bearing surface.

2. A magnetic head slider according to claim 1, wherein each projection extends to said air outlet end surface.

3. A magnetic head slider according to claim 1, wherein each projection extends to a side surface of each rail.

4. A magnetic head slider according to claim 1, wherein each projection is formed on said tapering surface and said air bearing surface of each rail so as to be inclined at an angle substantially equal to a yaw angle of said magnetic head slider at a position where said magnetic head slider and said magnetic disk make contact and slide.

5. A magnetic head slider according to claim 1, wherein each projection is formed from an amorphous carbon film.

6. A magnetic head slider according to claim 1, wherein each projection is formed from a thin oxide film.

7. A magnetic head slider according to claim 1, wherein said air bearing surface of each rail is crowned between said air outlet end surface and said tapering surface.

8. A magnetic head slider according to claim 1 wherein said tapering surface connects said air bearing surface with said air inlet end surface, forming a continuous surface therebetween, and said at least one projection extends along said tapering surface to said air inlet end surface.

9. A magnetic head slider according to claim 1 wherein at least one of said projections extends from said air inlet end surface to said air outlet end surface.

10. A magnetic head slider according to claim 1 further comprising at least one additional projection on said air bearing surface.

11. A magnetic head slider according to claim 1 wherein said pair of rails are connected to each other near said air inlet end surface via an intermediate rail portion, whereby a generally U-shaped rail is formed by a combination of said pair of rails and said intermediate rail portion.

12. A magnetic head slider according to claim 1 wherein each of said projections that projects from both said tapering surface and said air bearing surface is generally L-shaped.

13. A magnetic head slider having an air inlet end surface and an air outlet end surface, comprising:
  a pair of rails formed on a disk opposing surface opposed to a magnetic disk, each of said rails having a flat air bearing surface for generating a flying force during rotation of said magnetic disk and a tapering surface formed between said air bearing surface and said air inlet end surface;
  an electromagnetic transducer formed on said air outlet end surface at a termination point of one of said rails; and
  a projection formed continuously on said tapering surface and said air bearing surface of each rail, each of said projections extending to said air outlet end surface;
  wherein each projection is formed by partially removing said tapering surface and said air bearing surface of each rail, and further wherein said electromagnetic transducer at least partially overlaps one of said projections.

14. A magnetic head slider according to claim 13, further comprising a protective film formed on the surface of at least each projection, said protective film being formed from an amorphous carbon film.

15. A magnetic head slider according to claim 13, further comprising a protective film formed on the surface of at least each projection, said protective film being formed from a thin oxide film.

16. A magnetic head slider according to claim 13 wherein said projection that is at least partially overlapped by said transducer includes an enlarged portion in the vicinity of said transducer.

17. A vacuum magnetic head slider having an air inlet end surface and an air outlet end surface, comprising:
  a pair of rails formed on a disk opposing surface opposed to a magnetic disk, each of said rails having a flat air bearing surface for generating a flying force during rotation of said magnetic disk and a tapering surface formed between said air bearing surface and said air inlet end surface;
  a groove for generating a vacuum by expanding air that was once compressed, said groove being defined between said rails and being positioned at least partially behind at least a portion of said rails;
  an electromagnetic transducer formed on said air outlet end surface at a termination point of one of said rails; and
  a projection formed continuously on said tapering surface and said air bearing surface of each rail, each of said projections extending to a peripheral edge of said air bearing surface.

18. A magnetic head slider according to claim 17, wherein each projection is formed from an amorphous carbon film.

19. A magnetic head slider according to claim 17, wherein each projection is formed from a thin oxide film.

20. A magnetic disk drive comprising:
  a housing;
  a magnetic disk rotatably mounted in said housing;
  a magnetic head slider having an electromagnetic transducer for reading/writing data on said magnetic disk; and
  an actuator for moving said magnetic head slider across tracks of said magnetic disks;
  wherein said magnetic head slider includes:
  a pair of rails formed on a disk opposing surface opposed to said magnetic disk, each of said rails having a flat air bearing surface for generating a flying force during rotation of said magnetic disk and a tapering surface formed between said air bearing surface and an air inlet end surface of said magnetic head slider; and
  a projection formed continuously to project from and extend along both said tapering surface and said air bearing surface of each rail, each of said projections extending to a peripheral edge of said air bearing surface.

* * * * *